US011506049B2

United States Patent
Servin et al.

(10) Patent No.: US 11,506,049 B2
(45) Date of Patent: Nov. 22, 2022

(54) MAGNETIC EMULSIONS AS CONTRAST AGENTS FOR SUBSURFACE APPLICATIONS

(71) Applicant: SAUDI ARABIAN OIL COMPANY, Dhahran (SA)

(72) Inventors: Jesus Manuel Felix Servin, Dhahran (SA); Nan Shi, Dammam (SA); Amr I. Abdel-Fattah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/992,480

(22) Filed: Aug. 13, 2020

(65) Prior Publication Data

US 2022/0049599 A1 Feb. 17, 2022

(51) Int. Cl.
*E21B 47/11* (2012.01)
*C09K 8/58* (2006.01)
*E21B 43/20* (2006.01)

(52) U.S. Cl.
CPC ............. *E21B 47/11* (2020.05); *C09K 8/58* (2013.01); *E21B 43/20* (2013.01); *C09K 2208/10* (2013.01)

(58) Field of Classification Search
CPC ........ E21B 47/11; C09K 8/58; C09K 2208/10
See application file for complete search history.

(56) References Cited

U.S. PATENT DOCUMENTS

| | | | |
|---|---|---|---|
| 2012/0015852 | A1 | 1/2012 | Quintero et al. |
| 2014/0345863 | A1 | 11/2014 | Ladva et al. |
| 2015/0153472 | A1 | 6/2015 | Tour et al. |
| 2015/0240609 | A1 | 8/2015 | Lucas et al. |
| 2015/0268370 | A1 | 9/2015 | Johnston et al. |
| 2015/0376493 | A1 * | 12/2015 | Huh .................... C09K 8/805 166/252.6 |
| 2016/0040514 | A1 | 2/2016 | Rahmani et al. |
| 2016/0097750 | A1 | 4/2016 | Van Herzen et al. |
| 2017/0361376 | A1 | 12/2017 | Murugesan et al. |
| 2018/0171392 | A1 | 6/2018 | McCann et al. |
| 2020/0024506 | A1 | 1/2020 | Trudel et al. |

FOREIGN PATENT DOCUMENTS

| | | | | |
|---|---|---|---|---|
| CN | 101921584 | A | * | 12/2010 |
| CN | 102166365 | A | * | 8/2011 |
| FR | 3001154 | A1 | * | 7/2014 ......... A61K 49/1806 |
| WO | 2009027937 | A2 | | 3/2009 |
| WO | WO-2009029229 | A2 | * | 3/2009 .......... B01F 13/0062 |
| WO | WO-2011063023 | A2 | * | 5/2011 ............. C09K 8/805 |
| WO | WO-2014066793 | A1 | * | 5/2014 ............... G01V 3/26 |
| WO | 2015200789 | A1 | | 12/2015 |
| WO | WO-2016090092 | A1 | * | 6/2016 |

OTHER PUBLICATIONS

Translation of CN-101921584-A (Year: 2010).*
Translation of CN-102166365-A (Year: 2011).*
Zakinyan, Arthur and Yury Dikansky, "Drop deformation and magnetic permeability of a ferrofluid emulsion", Colloids and Surfaces A: Physiochemical and Engineering Aspects, Elsevier, Mar. 2011, 10.1016/j.colsurfa.2011.03.018 (10 pages).
Caizer, Costica, "Nanoparticle Size Effect on Some Magnetic Properties", Handbook of Nanoparticles, Springer International Publishing, 2016, pp. 475-519 (45 pages).
Kharisov, Boris I. et al., "Solubilization, dispersion and stabilization of magnetic nanoparticles in water and non-aqueous solvents: recent trends", RSC Advances, Royal Society of Chemistry, vol. 4, 2014, pp. 45354-45381 (28 pages).
Ku, Kang Hee et al., "Dynamically Reconfigurable, Multifunctional Emulsions with Controllable Structure and Movement", Advanced Materials, Wiley-VCH Verlag GmbH & Co. KGaA, vol. 31, 2019, DOI: 10.1002/adma.201905569 (8 pages).
International Search Report and Written Opinion issued in Application No. PCT/US2020/050642, dated Apr. 28, 2021 (15 pages).

* cited by examiner

*Primary Examiner* — Angela M DiTrani Leff
(74) *Attorney, Agent, or Firm* — Osha Bergman Watanabe & Burton LLP

(57) ABSTRACT

Provided is an injection fluid that may include a nanoemulsion having an oil phase dispersed in an aqueous phase, and non-superparamagnetic magnetic nanoparticles that are present in the dispersed oil phase. Further provided is a method for preparing an injection fluid that may include preparing a nanoemulsion from an aqueous phase and an oil phase having non-superparamagnetic magnetic nanoparticles therein, and may be used to form nanodroplets of the non-superparamagnetic magnetic nanoparticles. Further provided is a method for tracking movement of an injection fluid. The method may include introducing a tagged injection fluid into a hydrocarbon-containing reservoir, the tagged injection fluid may be a nanoemulsion that includes: an aqueous phase, an oil phase dispersed in the aqueous phase, and non-superparamagnetic nanoparticles that are present in the dispersed oil phase; and tracking the movement of the tagged injection fluid.

20 Claims, No Drawings

MAGNETIC EMULSIONS AS CONTRAST AGENTS FOR SUBSURFACE APPLICATIONS

BACKGROUND

A petroleum reservoir is an underground pool of hydrocarbon compounds contained in porous or fractured rock formations. The petroleum in the reservoir is accessed through one or more borings in the earth that penetrate the material above the reservoir and enable transport of the petroleum to the surface. Water flooding is used, for example, to increase the pressure within the reservoir, thereby increasing oil production rates; and to displace hydrocarbons with the reservoir. Water is ideal for flooding reservoirs due to its ready availability and immiscibility with hydrocarbons. Determining the presence of fluid flow paths between oil wells, and the flow capacity between them, allows for a more detailed description of reservoir heterogeneity and facilitates water flood rate management.

Contrast agents can be used to label injected fluids for electromagnetic data logging. These contrast agents are mixed with fracking fluids or sweep fluids such as those used for water flooding. As hydrocarbon reservoirs generally have less electromagnetic character than the contrast agents, the labelled injected fluids can be detected by electromagnetic sensors on equipment and devices. Monitoring the labelled injection fluids in hydrocarbon reservoirs provides information on the action of fluids for reservoir engineers to optimize injection and production strategies, as well as in-fill drilling.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein are directed to an injection fluid that may have a nanoemulsion that includes an oil phase dispersed in an aqueous phase, and non-superparamagnetic magnetic nanoparticles that are present in the dispersed oil phase, wherein an interfacial tension between the oil phase and the aqueous phase is in a magnitude range from about $10^{-5}$ to $10^{-6}$ N/m.

In another aspect, embodiments disclosed herein are directed to a method for preparing an injection fluid that may include preparing a nanoemulsion from an aqueous phase and an oil phase having an interfacial tension between the oil phase and the aqueous phase in a magnitude range from about $10^{-5}$ to $10^{-6}$ N/m; the oil phase may include non-superparamagnetic magnetic nanoparticles therein, thereby forming nanodroplets of the non-superparamagnetic magnetic nanoparticles.

In yet another aspect, embodiments disclosed herein are directed to a method for tracking movement of an injection fluid that may include introducing a tagged injection fluid into a hydrocarbon-containing reservoir, the tagged injection fluid being a nanoemulsion that may include: an aqueous phase, an oil phase dispersed in the aqueous phase, and non-superparamagnetic magnetic nanoparticles that are present in the dispersed oil phase; and track the movement of the tagged injection fluid.

Other aspects and advantages of the claimed subject matter will be apparent from the following description and the appended claims.

DETAILED DESCRIPTION

Embodiments of the present disclosure relate to magnetically labelling injection fluids using magnetic nanoemulsions. The magnetic nanoemulsions include nanodroplets of an oil phase that are suspended in an aqueous phase. Within the nanodroplets are non-superparamagnetic magnetic nanoparticles, which may serve as contrast agents upon injection downhole. The magnetic nanoemulsions may be introduced into a reservoir as the injection fluid and transported through the porous rock without the magnetic nanoparticles attaching to the rock surface. The non-superparamagnetic magnetic nanoparticles have inherent magnetism that is detectable without an external magnetic field.

Nanoemulsions

Magnetic nanoemulsions used to label injection water for use in hydrocarbon reservoirs include a dispersed oil phase and a continuous aqueous phase. A "nanoemulsion" as used herein is an emulsion of oil droplets in the range of 20-1000 nanometer (nm) that is dispersed throughout the aqueous phase. The two phases are immiscible. Within the dispersed oil phase (that is, oil droplets) are magnetic nanoparticles. By virtue of their inclusion with the dispersed oil droplets, the magnetic nanoparticles are encapsulated from the continuous aqueous phase of the injection fluid.

In one or more embodiments, the nanoemulsion may remain stable, that is, substantially maintain droplet size, at 80° C. for a period of at least 24 hours. For example, the nanoemulsion may remain stable for at least 3 days, 1 week, 3 weeks, 3 months, or 1 year. Such stability may make the nanoemulsions suitable for use in both near-wellbore (requiring stability in a range of at least 3 days to 4 weeks, for example) and deep reservoir applications (requiring stability over a longer time period, such as in a range of at least 2 months to 3 years). Further, even though the nanoparticles present in the nanodroplets are magnetized, the stability of the nanodroplets (and nanoemulsion) is such that the nanodroplets are unlikely to coalesce. It is also envisioned that the reservoir temperature is greater than or less than 80° C., and the presently disclosed fluids may be stable at temperatures such as 60° C.-150° C.

Emulsion stability may be determined visually with a sample, by checking for signs of phase separation and/or turbidity. Additionally, quantitative techniques may be used based on light scattering to monitor emulsion stability. Light scattering tests are known in the art and generally send light through the samples, wherein the presence of droplets and/or particles create backscattering. Further, by measuring intensity of the backscattered light, it is possible to determine droplet size and volume fractions of the sample.

In one or more embodiments, the magnetic nanoemulsions may be simple or multiple nanoemulsions. In particular, one or more embodiments may be a simple or multiple nanoemulsion in which the aqueous phase is the external or continuous phase. Thus, the simple nanoemulsion may be an oil-in-water nanoemulsion, and the multiple nanoemulsion may be a water-in-oil-in-water nanoemulsion. In both simple and multiple nanoemulsions, the oil is dispersed within the aqueous continuous phase. In the instance of a multiple nanoemulsion, the dispersed oil phase may have nanodroplets of water or another aqueous fluid within the dispersed oil nanodroplets, thus as an emulsion within an emulsion.

As mentioned, in one or more embodiments, the continuous or external phase is aqueous. The base component of the continuous aqueous phase can be any form of water, including but is not limited to, fresh water, mineral water, synthetic, filtered and natural sea waters, brackish water, synthetic and natural brines, formation water, and production water. The water may contain a level of organics from natural or artificial sources as long as the function of the magnetic nanoemulsion, which is to both provide magnetic contrast to the injection fluid and resist a high temperature and high salinity environment, is not inhibited. The water may contain a level of minerals or metals from natural or artificial sources as long as the function of the magnetic nanoemulsion is not inhibited.

In one or more embodiments, the salinity of the injection fluid may be between 1,000 ppm TDS to 56,000 ppm TDS. For example, it may have a salinity having a lower limit of any of 1,000, 5,000, 10,000, or 20,000 ppm TDS, and an upper limit of any of 25,000, 30,000, 40,000, 50,000, or 56,000 ppm TDS, where any lower limit can be used in combination with any upper limit. In one or more embodiments, the downhole salinity of the reservoir may range from 40,000 ppm TDS to 100,000 ppm TDS. Salts that may be present include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase.

It is noted that advantageously, the salinity of the injection water need not be controlled when using a magnetic nanoemulsion. By encapsulating the magnetic nanoparticles in oil nanodroplets, the magnetic nanoparticles are not exposed to the aqueous phase (or the salinity of the aqueous phase), thereby increasing the stability of the magnetic nanoparticles. Further, upon the injection fluid encountering the higher salinity present in the reservoir, the fluid may still remain stable based on the presence of the magnetic nanoparticles in the oil phase.

In one or more embodiments, the oil phase forming the discontinuous phase of the nanoemulsions may be any oleaginous fluid, including a natural or synthetic liquid oil, and derivatives or fractions of these. The dispersed oil phase may be or may contain diesel oil, mineral oil, aromatic hydrocarbons, hydrogenated or non-hydrogenated olefins such as poly-alpha-olefins, alpha-olefins, linear and branched olefins, poly-diorganosiloxanes, siloxanes, organosiloxanes, esters of fatty acids, straight chain, branched or cyclical alkyl ethers of fatty acids, esters, phosphate-esters, ethers, acetals, dialkylcarbonates, or combinations of any of these. In one or more embodiments, the oil may be a petroleum-based hydraulic fluid. In one or more embodiments, the oil used in the nanoemulsion has a density lower than water.

In one or more embodiments, the oil phase may be present in a range of 0.1-10% by volume in the nanoemulsion. For example, the oil phase may form a volume fraction having a lower limit of any of 0.1, 0.5, 1.0, or 2.0%, and an upper limit of any of 5, 7, or 10% of the nanoemulsion, where any lower limit can be used in combination with any upper limit. The emulsion may be prepared with such oil fraction and then injected as is or it is also envisioned that an emulsion having a higher volume fraction of the oil phase may be initially formed and then subsequently diluted (such as formed off-site and diluted at the wellsite) to achieve a concentration between 0.1 and 10% by volume oil droplets in the nanoemulsion.

In one or more embodiments, the two phases of the nanoemulsion have a low interfacial tension between them. In one or more embodiments, such interfacial tension may have a magnitude of about $10^{-5}$ to $10^{-6}$ Newton per meter (N/m). Such interfacial tension may be achieved by using a surfactant to stabilize the dispersed oil phase as nanodroplets within the continuous aqueous phase. Examples of surfactants are not particularly limited and include any suitable surfactant for an EOR treatment in the specific reservoir.

In one or more embodiments, the viscosity of the nanoemulsion i.e., the aqueous phase having the oil phased dispersed therein, as it is injected into the reservoir (at downhole conditions) is less than 10 centipoise (cP).

Magnetic Nanoparticles

As mentioned above, the nanoemulsions of the present disclosure may be provided with magnetic nanoparticles that are present in the dispersed oil phase. One or more embodiments of the present invention includes non-superparamagnetic magnetic nanoparticles. "Superparamagnetic nanoparticles" are nanoparticles that display magnetic properties when exposed to an external magnetic field. "Nonsuperparamagnetic magnetic nanoparticles" are nanoparticles that are magnetic but are not superparamagnetic. The class of non-superparamagnetic magnetic nanoparticle is not particularly limited and may include one or more of, for example, diamagnetic, paramagnetic, ferromagnetic, and ferrimagnetic nanoparticles.

One or more embodiments of non-superparamagnetic magnetic nanoparticles include elements selected from the group of iron, nickel, and cobalt, which may be present as metals or metal oxides. A non-limiting example of an iron-containing compound is iron oxide, including magnetite, maghemite, hematite, and ferrites selected from nickel ferrite, aluminum ferrite, manganese ferrite, zinc ferrite, and cobalt ferrite. However, it is also intended that other non-superparamagnetic nanoparticles that are dispersible in an oleaginous fluid may be used. Further, it is also envisioned that the magnetic nanoparticles may be added to the nanoemulsion in the form of a solid or suspended in a carrier fluid phase, such as ferrofluids.

The size of the magnetic nanoparticles is less than the size of the oil droplet in which the magnetic nanoparticles are found. Thus, in one or more embodiments, the magnetic nanoparticles may have a diameter (or largest dimension in the case of non-spherical particles) that are greater than 1 nm and having an upper limit of the size of the oil droplets, which is described above as ranging from 20 to 1000 nm. In one or more embodiments, the nanoparticles have a diameter (or largest dimension) having a lower limit of any of 1, 3, 5, 10, 25, or 50 nm and an upper limit of any of 500, 650, 800, or 1000 nm, where any lower limit can be used in combination with any upper limit.

In one or more embodiments, the nanoparticles may be present in the oil phase in an amount ranging from a lower limit of any of 10, 20, 30, or 50% by volume of the oil phase to an upper limit of any of 40, 50, 60, 70, or 73% by volume, relative to the total oil volume.

The magnetic behavior of the magnetic particles may vary based on nanoparticle size, and thus, the particle size of the magnetic nanoparticles may be selected based on such magnetic behaviors. For example, at about 80-90 nm, magnetite transitions from a magnetic multi-domain structure to a single-domain structure. Reducing further the size to 25-30 nm or smaller, magnetite nanoparticles become superparamagnetic at room temperature.

Size of nanoparticles may also be selected to reduce or avoid settling of the nanoparticles. When magnetic nanoparticles of similar composition are compared, magnetic nanoparticles with a larger size may have a greater probability to settle in seawater than nanoparticles with a smaller size. Compounds used to produce magnetic nanoparticles can have a greater density than seawater. As a non-limiting example, when magnetite is mixed with seawater (having a density of around 1,020-1,050 kilograms per meter cubed ($kg/m^3$)), magnetite may settle as its density is around 5,170 $kg/m^3$. Thus, by encapsulating magnetic nanoparticles in a dispersed oil phase (that is less dense than water), settling of the magnetic nanoparticles is reduced or does not occur.

The settling (or avoidance of settling) of a magnetic nanoparticle from solution is related in part to its buoyancy within the aqueous phase. A radius of the magnetic nanoparticle that results in its neutral buoyancy is estimated by using Equation (Eq.) I, wherein one magnetic nanoparticle is encapsulated by one droplet:

$$r_{np} = \left( \frac{r_{droplet}^3 (\rho_{cp} - \rho_{dp})}{(\rho_{np} - \rho_{dp})} \right)^{\frac{1}{3}} \quad \text{Eq. I}$$

where $r_{np}$ is the radius of the magnetic nanoparticle, $r_{droplet}$ is the radius of the droplet, $\rho_{ep}$ is the density of the continuous phase, $\rho_{dp}$ is the density of the dispersed phase and $\rho_{ap}$ is the density of the magnetic nanoparticle, in SI units. In one or more embodiments, $r_{np}$ of nanodroplets with a positive buoyancy contributes to the stability of the encapsulated magnetic nanoparticles, such that the magnetic nanoparticles do not settle. Thus, the size of the nanoparticles may be selected based on the size of the oil droplets, density of the magnetic particles, density of the aqueous phase, and density of the oil phase so that a positive buoyancy may be achieved.

In one or more embodiments, the magnetic particles may be non-functionalized, or without a functionalized surface with polymers or other coatings. Simple nanoparticles that are used in one or more embodiments provide decreased complexity and synthetic expense as well as a lower the overall size compared to a complex nanoparticle having such a functionalized surface. While functionalized surfaces are commonly used to improve stability of particles, a coating or functionalization increases the effective size of the nanoparticle. Consequently, the core nanoparticle in a functionalized nanoparticle is smaller than a non-functionalized nanoparticle to achieve the same overall size. That is, when comparing a non-functionalized and a functionalized nanoparticle having the same overall size, the core of the functionalized nanoparticle is smaller than that of a non-functionalized nanoparticle. A larger core of a non-functionalized nanoparticle allows for increased contrast of magnetic nanoparticles in situ whereas a smaller core for a functionalized nanoparticle reduces the contrast achieved by the magnetic nanoparticles for a given volume fraction. Advantageously, by dispersing magnetic nanoparticles in an oil phase emulsified in water, rather than directly in water, it is possible to avoid the need for complex surface functionalization while retaining stability, transportability, and nanoparticle size. By dispersing a non-functionalized magnetic nanoparticle in a dispersed oil phase of a nanoemulsion, greater contrast is provided over the functionalized nanoparticle and without the synthesis and production of a functionalized surface.

Agglomeration between nanoparticles is generally lower with superparamagnetic nanoparticles than with non-superparamagnetic magnetic nanoparticles. However, when in the presence of an external magnetic field, superparamagnetic nanoparticles may have a property of agglomeration. In one or more embodiments, an effect of agglomeration is reduced via encapsulation of the non-superparamagnetic magnetic nanoparticles from the continuous aqueous phase and dispersion in the dispersed oil phase. Furthermore, advantageously, the encapsulated non-superparamagnetic magnetic nanoparticles may not be influenced by an external magnetic field to agglomerate.

Agglomeration may be quantified by measuring the size of the nanoparticles over time. If the size increases, agglomeration is occurring. Light scattering techniques may be used to quantify nanoparticle size increases due to agglomeration.

Agglomeration of the magnetic nanoparticles conventionally results from exposure to extreme salinities. In reservoirs, extremely high salinities are often encountered: for example, NaCl concentrations may be greater than 5% wt., and $CaCl_2$ concentrations may reach 1-2% wt. or more. The extreme salinity reduces the thickness of double layers on charged particles, which weakens the electrostatic repulsion between the nanoparticles and the like-charged mineral surfaces. The weak electrostatic interactions often cause agglomeration of nanoparticles (i.e., unstable suspensions) and strong nanoparticle adsorption on mineral surfaces of the rock, which would be detrimental to nanoparticle transport through the geological structures. Advantageously, the inclusion of the magnetic nanoparticles in a dispersed oil phase encapsulates and protects the magnetic nanoparticles from exposure to such high salinity environments, thereby reducing the agglomeration and adsorption that are conventionally faced by magnetic nanoparticles dispersed directly into an injection fluid without an encapsulating oil phase.

Moreover, while the magnetic nanoparticles may remain suspended within the fluid and not settle by being encapsulated in the dispersed oil phase, the encapsulating oil droplets do not interfere with the use of the magnetic nanoparticles to serve as a contrast in the injection fluid. Under the interfacial tension conditions described above, the oil nanodroplets may deform to take the shape of the magnetic field of the nanoparticle contained therein, elongating along the direction of the magnetic field. The semiaxial ratio of the deformed nanodroplet increases as the magnetic bond number (Bm) increases, as shown in Eq. II.

$$Bm = \mu_0 H^2 R / \sigma \quad \text{Eq. II}$$

where $\mu_0$ is the magnetic permeability of free space, H is the magnetic field strength, R is the radius of the droplet in the absence of a magnetic field, and $\sigma$ is the interfacial tension. In one or more embodiments, $\mu_0$ is replaced in formula (I) with $\mu$. $\mu$ refers to the magnetic permeability as a property of the material, where $\mu_0$ refers to the magnetic permeability in a vacuum.

As the nanodroplets deform, they stretch and their demagnetization factor diminishes compared to a nanodroplet that is not deformed. A diminished demagnetization factor further increases magnetic permeability and magnetic contrast efficiency of the magnetic nanoparticle. In one or more embodiments, when the nanodroplets deform due to magnetism, they collectively, based on alignment of elongated droplets, are better contrast agents than droplets without deformation. Increased magnetic contrast is provided by increase of magnetic permeability. As magnetic permeability increases, it is easier to locate the nanoemulsion.

Methods

Two synthetic routes to prepare nanoemulsions include: high energy and low energy preparation. A non-limiting example of a high-energy nanoemulsion preparation is ultrasonication. A non-limiting example of a low-energy nanoemulsion preparation is spontaneous emulsification. In one or more embodiments, low energy nanoemulsion preparation is used for synthesizing magnetic nanoemulsions. The low energy nanoemulsion preparation may improve magnetic nanoparticle stability. Generally, low energy preparation methods use less than or equal to 1 kilowatt per kilogram (kW/kg) of power.

The magnetic nanoparticles effectively serve as a tag for the injection fluid (emulsion) as it is injected into the reservoir. The tagged injection fluid is introduced into a hydrocarbon bearing formation in a reservoir and the tracking of the tagged injection fluid movement commences. "Tag" or "tagging" herein has the same meaning as label or labelling. Thus, in one or more embodiments, the emulsion serves as a "tagged" fluid that is injected into the reservoir.

To track the tagged injection fluid, the reservoir may be surveyed using electromagnetic signals and measuring changes in magnetic contrast. Detection is provided when the tagged injection fluid localizes in a target injection zone of the reservoir. In the presence of a magnetically tagged fluid, the injection fluid increases its magnetic contrast and the location of the fluids are determined.

In one or more embodiments, the magnetic contrast needed to view the tagged injection fluid depends on the distance away from the wellbore and method of detection. As a non-limiting example in near-wellbore applications and induction-like detection methods, an effective relative magnetic permeability of 1.02 may be used. In another non-limiting example, reservoir applications with detection based on travel-time and amplitude tomography an effective relative magnetic permeability of at least 2 is used.

In one or more embodiments, the method of detecting the tagged fluid in the reservoir is not limited. For example, one method is similar to cross-well ground penetrating radar and may use travel-time and amplitude tomography to locate the tagged injection fluid. Another method may use a coil to broadcast a magnetic field and measure the voltage induced in a receiver coil. The induced voltage depends on the magnetic properties of the fluids in the formation. The first method may be better suited for deep reservoir applications while the second method may be more applicable to near-wellbore applications.

One or more methods of the present disclosure may include injecting the magnetic nanoemulsions described herein into a geological structure; placing at least one magnetic probe in a proximity to the geological structure; generating a magnetic field within the geological structure with the at least one magnetic probe; and detecting a magnetic signal resulting from the magnetic field generated within the geological structure.

The geological structure may comprise a deposit selected from the group consisting of oil, gas, and combinations thereof. The geological structure may be penetrated by at least one vertical wellbore, at least one horizontal wellbore, or a combination thereof. The magnetic nanoparticle dispersion may migrate from the injection site into the geological structure up to 2 m, 5 m, 10 m, 20 m, 50 m, 100 m, 150 m, 200 m, 250 m, 300 m, 350 m, 400 m, 450 m, 500 m, or more, or 15 cm, 30 cm, 100 cm, 1 m, or more into a core sample of a geological structure. The magnetic nanoemulsions may advantageously maintain emulsion stability under harsh salinity and reservoir conditions within the geological structure or within a standard API brine. Further, through inclusion in the dispersed oil phase, the magnetic nanoparticle may have an adsorption onto the rock particle that is sufficiently low such that the magnetic nanoparticles migrate into the geological structure the distances describe above.

In one or more embodiments, injected water, used to displace hydrocarbons, may be tagged with the magnetic nanoparticles as described herein, and after a period of injection, the paths of high permeability and invasion by such injected water can be mapped. In a situation where water has been injected for a long period of time, it can be difficult to differentiate original (connate) water from injected water. By 'labeling' new injection water with magnetic particles, as described, in such a way that the new injection water imparts magnetic permeability to the invaded region, it is possible to differentiate new from old water.

In one or more embodiments, magnetic contrast enhancement provides a unique signature for injected fluids. Oil, gas, water, brine and reservoir rocks generally have essentially zero magnetic character. Thus, one or more embodiments are directed to the presently described injected fluids being used to change the magnetic character of the reservoir volume invaded by such fluids. The group velocity of an EM signal depends on the dielectric permittivity and magnetic permeability of the medium in a very simple way: $v=(\epsilon\mu)^{-1/2}$. Thus, by injecting a fluid with $\mu=10$ into a formation with 20% porosity, that reservoir volume will have an effective magnetic permeability of 2, and the velocity of an EM wave traversing it will decrease by about 30% (1/1.414). This time shift is easily detectable with modern waveform recording instruments.

Thus, one or more applications of method embodiments are not limited to may include: monitoring fluid movement in the reservoir, developing agents that can be directed using magnetic fields, and determining if diversion treatments should be applied in waterflooding. For example, by tracking the path of the presently disclosed injection fluids, diversion treatments may be designed such that subsequent water flooding operations are diverted to portions of the reservoir that were not accessed by prior flooding operations. Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

The term "substantially" as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An injection fluid, comprising:
   a nanoemulsion comprising an oil phase dispersed in an aqueous phase, the dispersed oil phase being oil nanodroplets that have a diameter of from 20-1000 nanometers, and a surfactant stabilizing the dispersion of the oil phase in the aqueous phase; and
   non-superparamagnetic magnetic nanoparticles encapsulated in the oil nanodroplets;
   wherein an interfacial tension between the oil phase and the aqueous phase is in a magnitude range from about $10^{-5}$ to $10^{-6}$ N/m.

2. The injection fluid of claim 1, wherein the salinity of the injection fluid is between 1,000 ppm and 56,000 ppm TDS.

3. The injection fluid of claim 1, wherein the non-superparamagnetic magnetic nanoparticles range from 1 nm to 1000 nm in diameter.

4. The injection fluid of claim 3, wherein the non-superparamagnetic magnetic nanoparticles range from 50 nm to 500 nm in diameter.

5. The injection fluid of claim 1, wherein the non-superparamagnetic magnetic nanoparticles include one or more elements from the group consisting of iron, nickel, and cobalt.

6. The injection fluid of claim 1, wherein the oil phase has a density less than the aqueous phase.

7. The injection fluid of claim 1, wherein the nanodroplets of the dispersed oil phase that encapsulate the non-superparamagnetic magnetic nanoparticles are configured to deform to take the shape of a magnetic field of the nanoparticle contained in each of the nanodroplets, elongating along the direction of the magnetic field, from magnetism of the non-superparamagnetic magnetic nanoparticles.

8. The injection fluid of claim 1, wherein the nanoemulsion is selected from one or more of the group consisting of an oil-in-water nanoemulsion and a water-in-oil-in-water nanoemulsion.

9. The injection fluid of claim 1, wherein the concentration of nanoparticles is up to 73% by volume of the oil phase.

10. The injection fluid of claim 1, wherein the interfacial tension between the oil phase and the aqueous phase is configured to allow the nanodroplets to deform to take the shape of a magnetic field of the nanoparticles contained therein, elongating along the direction of the magnetic field.

11. A method for preparing an injection fluid, comprising:
    preparing a nanoemulsion from an aqueous phase and an oil phase, the oil phase dispersed in the aqueous phase, the dispersed oil phase being oil nanodroplets that have a diameter of from 20-1000 nanometers, and a surfactant stabilizing the dispersion of the oil phase in the aqueous phase, the nanoemulsion having an interfacial tension between the oil phase and the aqueous phase in a magnitude range from about $10^{-5}$ to $10^{-6}$ N/m, the oil phase comprising non-superparamagnetic magnetic nanoparticles encapsulated in the oil nanodroplets, thereby forming nanodroplets of the non-superparamagnetic magnetic nanoparticles.

12. The method of claim 11, wherein the preparing comprises a low energy nanoemulsion preparation, wherein the low energy nanoemulsion preparation uses less than or equal to 1 kW/kg of power.

13. The method of claim 11, wherein the oil phase is present in an amount ranging from 1-10% of the nanoemulsion.

14. The method of claim 11, further comprising: adding the non-superparamagnetic magnetic nanoparticles to the oil phase.

15. A method for tracking movement of an injection fluid, comprising:
    introducing a tagged injection fluid into a hydrocarbon-containing reservoir, the tagged injection fluid being a nanoemulsion that comprises:
    a surfactant;
    an aqueous phase;
    an oil phase dispersed in the aqueous phase, the dispersed oil phase being oil nanodroplets that have a diameter of from 20-1000 nanometers, the surfactant stabilizing the dispersion of the oil phase in the aqueous phase, the nanoemulsion having an interfacial tension between the oil phase and the aqueous phase in a range of from about $10^{-5}$ to $10^{-6}$ N/m; and
    non-superparamagnetic magnetic nanoparticles encapsulated in the dispersed oil phase, thereby forming nanodroplets of the non-superparamagnetic magnetic nanoparticles; and
    tracking the movement of the tagged injection fluid.

16. The method of claim 15, wherein introducing the tagged injection fluid allows for localization of the tagged injection fluid in a target injection zone.

17. The method of claim 15, wherein tracking the movement of the tagged injection fluid comprises applying a magnetic field, surveying the reservoir and measuring changes in magnetic contrast.

18. The method of claim 17, wherein, upon applying the magnetic field, the nanodroplets of the dispersed oil phase that encapsulate the non-superparamagnetic magnetic nanoparticles deform from magnetism of the non-superparamagnetic magnetic nanoparticles, to take the shape of a magnetic field of the nanoparticle contained in each of the nanodroplets, elongating along the direction of the magnetic field.

19. The method of claim 15, wherein the tagged injection fluid, as it is injected into the hydrocarbon-containing reservoir, has a viscosity that is less than or equal to 10 centipoise (cP).

20. The method of claim 15, wherein a salinity of the hydrocarbon containing reservoir ranges from 40,000 to 100,000 ppm TDS.

* * * * *